(12) United States Patent
Liao et al.

(10) Patent No.: US 10,359,921 B2
(45) Date of Patent: Jul. 23, 2019

(54) METHODS FOR TRANSCEIVING DATA WITH CLIENT DEVICES VIA DYNAMICALLY DETERMINED TCP (TRANSMISSION CONTROL PROTOCAL) PORT NUMBERS WHEN OPERATING INTERACTIVE WHITEBOARDS AND APPARATUSES USING THE SAME

(71) Applicant: Wistron Corp., New Taipei (TW)

(72) Inventors: Fang-Wen Liao, New Taipei (TW); Pen-Tai Miao, New Taipei (TW); Ping-Hung Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 1203 days.

(21) Appl. No.: 14/568,501

(22) Filed: Dec. 12, 2014

(65) Prior Publication Data
US 2016/0098181 A1    Apr. 7, 2016

(30) Foreign Application Priority Data
Oct. 7, 2014  (TW) .............................. 103134843 A

(51) Int. Cl.
*G06F 3/0484* (2013.01)
*G06F 3/0481* (2013.01)
(Continued)

(52) U.S. Cl.
CPC ........ *G06F 3/04847* (2013.01); *G06F 3/0481* (2013.01); *G06F 3/0486* (2013.01);
(Continued)

(58) Field of Classification Search
None
See application file for complete search history.

(56) References Cited

U.S. PATENT DOCUMENTS 5,745,711 A * 4/1998 Kitahara ............. G06F 3/04842
715/753
5,767,897 A * 6/1998 Howell .................... H04N 7/15
348/14.07

(Continued)

FOREIGN PATENT DOCUMENTS

WO    WO 2006/113711    10/2006

*Primary Examiner* — Jennifer N To
*Assistant Examiner* — Joseph R. Burwell
(74) *Attorney, Agent, or Firm* — McClure, Qualey & Rodack, LLP

(57) ABSTRACT

The invention introduces a method for operating interactive whiteboards, performed by a processing unit of a control node, which contains at least the following steps. A connected-device display region, a multi-screen layout region and a whiteboard display region are provided on an interactive display device. After detecting that an icon of the connected-device display region is dragged and dropped into a block of the multi-screen layout region, a network address associated with the icon is obtained. A TCP port number associated with the block of the connected-device display region, which contains the dropped icon, is obtained. A ready notification containing the TCP port number is transmitted to the network address. Screen data with the TCP port number is received. The screen data is displayed on a block of the whiteboard display region, which is associated with the block of the connected-device display region.

20 Claims, 11 Drawing Sheets

(51) Int. Cl.
  *G06F 3/0486* (2013.01)
  *G09G 5/14* (2006.01)
  *G06F 9/451* (2018.01)
  *G06F 3/14* (2006.01)

(52) U.S. Cl.
  CPC .......... *G06F 3/04817* (2013.01); *G06F 9/452* (2018.02); *G09G 5/14* (2013.01); *G06F 3/1431* (2013.01); *G09G 2354/00* (2013.01); *G09G 2370/022* (2013.01); *G09G 2370/027* (2013.01)

(56) References Cited

U.S. PATENT DOCUMENTS

| | | | | |
|---|---|---|---|---|
| 5,889,954 | A * | 3/1999 | Gessel | H04L 41/0816 370/467 |
| 7,559,031 | B2 * | 7/2009 | Kawamura | H04N 7/147 348/14.08 |
| 7,770,120 | B2 | 8/2010 | Baudisch | |
| 7,870,192 | B2 * | 1/2011 | Greenlee | H04L 29/06027 370/260 |
| 2002/0116539 | A1 * | 8/2002 | Bryczkowski | G06F 9/465 719/317 |
| 2004/0015980 | A1 * | 1/2004 | Rowen | G06F 11/321 719/310 |
| 2005/0259824 | A1 * | 11/2005 | Isozaki | H04L 63/061 380/255 |
| 2006/0026275 | A1 * | 2/2006 | Gilmour | H04L 41/12 709/223 |
| 2006/0036671 | A1 * | 2/2006 | Rhim | H04L 67/16 709/202 |
| 2006/0154227 | A1 * | 7/2006 | Rossi | G09B 5/14 434/350 |
| 2008/0040522 | A1 * | 2/2008 | Matthews | G06F 3/023 710/107 |
| 2008/0048975 | A1 * | 2/2008 | Leibow | G06F 3/023 345/156 |
| 2009/0217177 | A1 * | 8/2009 | DeGrazia | G06F 3/0481 715/753 |
| 2010/0169791 | A1 * | 7/2010 | Pering | G06F 3/1423 715/740 |
| 2011/0035685 | A1 * | 2/2011 | Johanson | H04N 7/15 715/753 |
| 2011/0063191 | A1 * | 3/2011 | Leung | G06F 3/0481 345/1.1 |
| 2012/0005269 | A1 * | 1/2012 | Janssen | G06F 3/0481 709/203 |
| 2012/0089433 | A1 * | 4/2012 | Kwahk | G06Q 10/063114 705/7.15 |
| 2013/0009887 | A1 * | 1/2013 | Huang | H04L 65/4092 345/173 |
| 2013/0024795 | A1 * | 1/2013 | Robotham | G06F 3/0486 715/769 |
| 2013/0139234 | A1 * | 5/2013 | Inbaraj | G06F 21/305 726/7 |
| 2013/0304841 | A1 * | 11/2013 | Hummel | G06F 15/1735 709/212 |
| 2014/0133836 | A1 | 5/2014 | Burns | |
| 2014/0282090 | A1 * | 9/2014 | Waxman | H04L 65/403 715/753 |
| 2015/0052442 | A1 * | 2/2015 | Li | H04L 41/0846 715/735 |
| 2015/0215570 | A1 * | 7/2015 | Leibow | G06F 3/1454 386/231 |

\* cited by examiner

METHODS FOR TRANSCEIVING DATA WITH CLIENT DEVICES VIA DYNAMICALLY DETERMINED TCP (TRANSMISSION CONTROL PROTOCAL) PORT NUMBERS WHEN OPERATING INTERACTIVE WHITEBOARDS AND APPARATUSES USING THE SAME

CROSS REFERENCE TO RELATED APPLICATIONS

This application claims priority of Taiwan Patent Application No. 103134843, filed on Oct. 7, 2014, the entirety of which is incorporated by reference herein.

BACKGROUND

Technical Field

The present invention relates to screencasting, and in particular to methods for operating interactive whiteboards and apparatuses using the same.

Description of the Related Art

Screen-sharing enables wired or wireless delivery of screen images to or from desktop computers, tablet computers, mobile phones, and other devices. It allows users to, for example, duplicate a display from a desktop computer onto two or more mobile phones, or duplicate displays from two or more mobile phones on the display device of a desktop computer. An electronic whiteboard system contains a server and several user terminals. However, conventional screen-sharing does not support a centralized configuration and management. Thus, it is difficult for a user to coordinate with two or more user terminals to complete the functions of an interactive whiteboard. Thus, it is desirable to have methods for operating interactive whiteboards and apparatuses using the same to address the aforementioned drawback.

BRIEF SUMMARY

An embodiment of the invention introduces a method for operating interactive whiteboards, performed by a processing unit of a control node, which contains at least the following steps. A connected-device display region, a multi-screen layout region and a whiteboard display region are provided on an interactive display device. The multi-screen layout region is segmented into multiple blocks, the whiteboard display region is segmented into multiple blocks and each block of the multi-screen layout region is identically associated with one block of the whiteboard display region. After detecting that an icon of the connected-device display region is dragged and dropped into one block of the multi-screen layout region, a network address associated with the icon is obtained. A TCP (Transmission Control Protocol) port number associated with the block of the connected-device display region, which contains the dropped icon, is obtained. A ready notification containing the TCP port number is transmitted to the network address. Screen data with the TCP port number is received. The screen data is displayed on one block of the whiteboard display region, which is associated with the block of the connected-device display region.

An embodiment of the invention introduces an apparatus for operating interactive whiteboards, which contains at least an interactive display device, a communications interface and a processing unit. The interactive display device provides a connected-device display region, a multi-screen layout region and a whiteboard display region. The multi-screen layout region is segmented into multiple blocks, the whiteboard display region is segmented into multiple blocks and each block of the multi-screen layout region is identically associated with one block of the whiteboard display region. After detecting that an icon of the connected-device display region is dragged and dropped into one block of the multi-screen layout region, the processing unit obtains a network address associated with the icon, and a TCP port number associated with the block of the connected-device display region, which contains the dropped icon. The processing unit transmits a ready notification containing the TCP port number to the network address via the communications interface, and receives screen data with the TCP port number via the communications interface. The processing unit displays the screen data on one block of the whiteboard display region, which is associated with the block of the connected-device display region.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
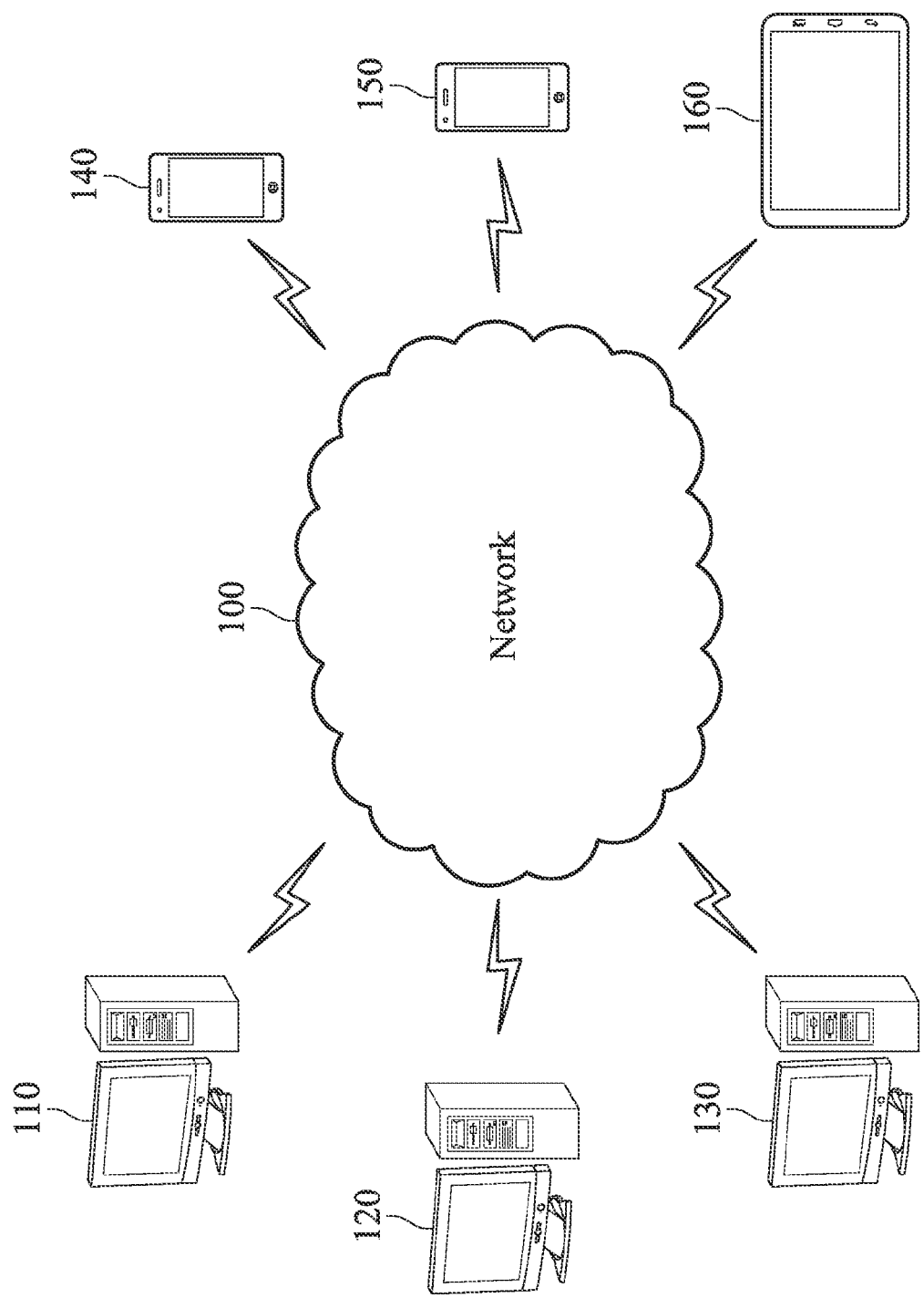
FIG. 1 illustrates the system architecture for an electronic whiteboard system according to an embodiment of the invention.

FIG. 1 illustrates the system architecture for an electronic whiteboard system according to an embodiment of the invention, containing desktop computers 110, 120 and 130, mobile phones 140 and 150, and a tablet computer 160. Each of the desktop computers 110 to 130 may contain a main unit, a display device and an input device. Either the mobile phone 140, 150 or the tablet computer 160 includes a display device. The display device is equipped with a display panel, such as a TFT-LCD (Thin film transistor liquid-crystal display) panel, or an OLED (Organic Light-Emitting Diode) panel, to display input letters, alphanumeric characters and symbols, dragged paths, drawings, or screens provided by an application for the user to view. The desktop computer 110 operates as a control node of an electronic whiteboard system, and the desktop computers 120 and 130, the mobile phones 140 and 150, and the tablet computer 160 may employ a wireless communications technology, such as Wi-Fi, Wi-Fi Connect®, Bluetooth®, etc., to connect to the desktop computer 110. If required, the following may refer to the desktop computers 120 and 130, the mobile phones 140 and 150, and the tablet computer 160 as client devices. Although the client device shown in the embodiments is a desktop computer, a mobile phone or a tablet computer, it should be understood that alternative embodiments are contemplated, such as a notebook computer, etc.

Figure 2:
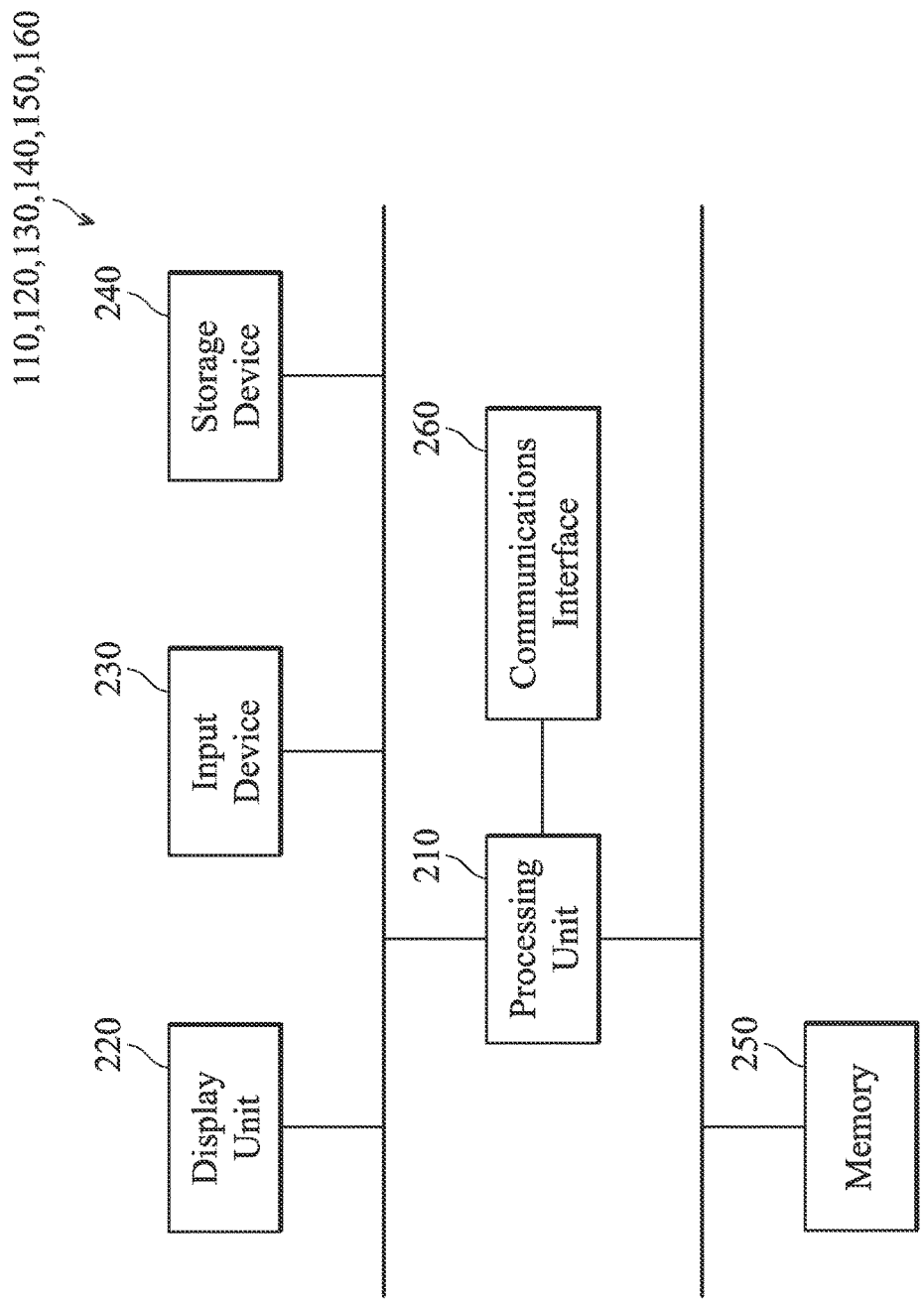
FIG. 2 is the system architecture of an electronic apparatus according to an embodiment of the invention.

FIG. 2 is the system architecture of an electronic apparatus according to an embodiment of the invention. The system architecture may be practiced in any of the desktop computers 110, 120 and 130, the mobile phones 140 and 150, and the tablet computer 160, or another electronic device with a computation capability. A processing unit 210 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The system architecture further includes a memory 250 for storing necessary data in execution, such as variables, data tables, playlists, etc., and a storage unit 240 for storing a wide range of electronic files, such as Web pages, digital documents, video files, audio files, etc. A communications interface 260 is included in the system architecture and the processing unit 210 can thereby communicate with another electronic device. The communications interface 260 may be a wireless telecommunications module, a LAN (Local Area Network) communications module or a WLAN (Wireless Local Area Network). The wireless telecommunications module may have modems supporting arbitrary combinations of the 2G, 3G, 4G and the higher-generation technology. The system architecture further includes one or more input devices 230 to receive user input, such as a keyboard, a mouse, a touch panel, etc. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 220 may include a display panel, such as a TFT-LCD (Thin film transistor liquid-crystal display) panel or an OLED (Organic Light-Emitting Diode) panel, to display input letters, alphanumeric characters, symbols, dragged paths, drawings, or screens provided by an application for the user to view.

Figure 3:
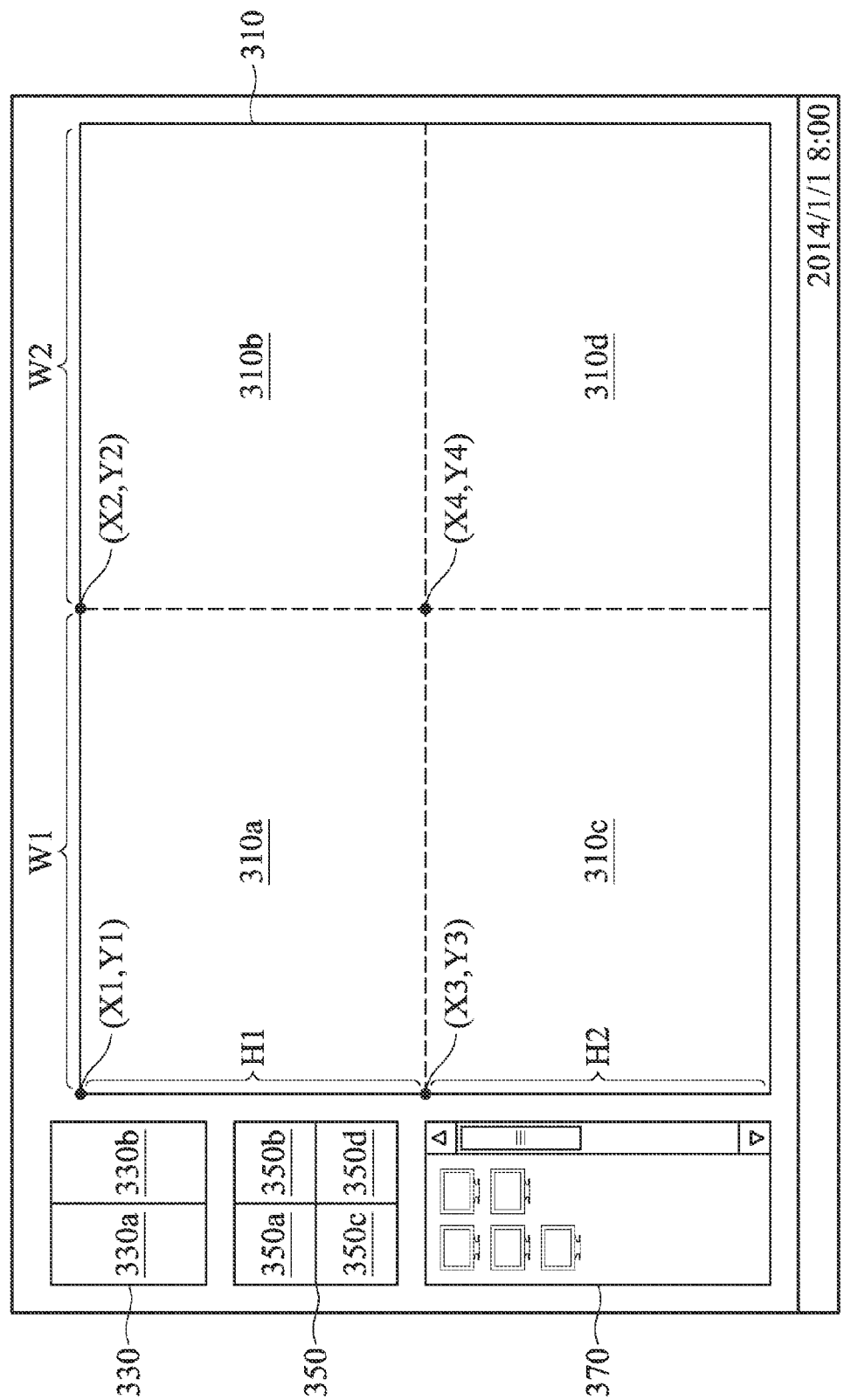
FIG. 3 is a schematic diagram illustrating a screen image of an interactive whiteboard according to an embodiment of the invention.
Figure 4:
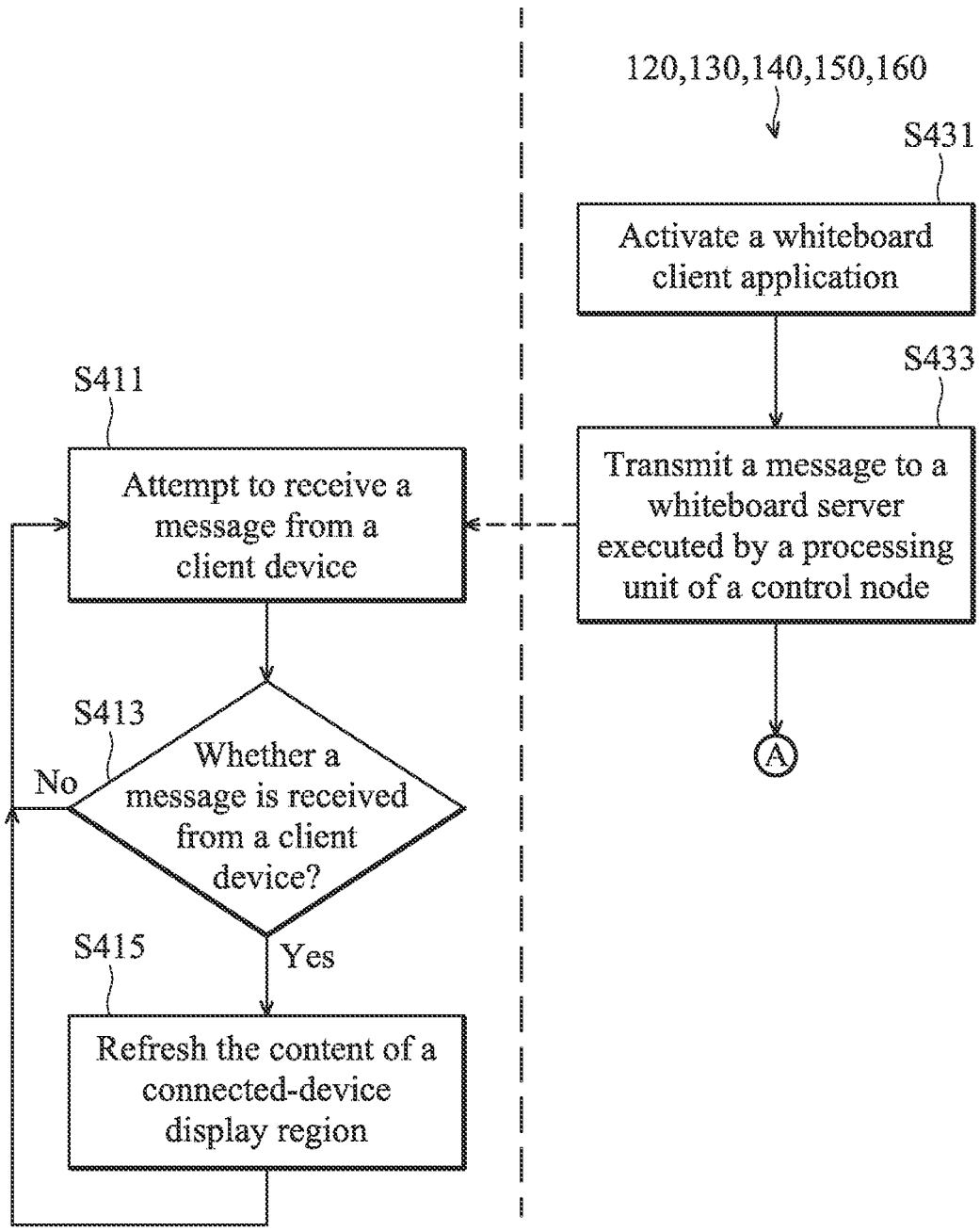
FIG. 4 is a flowchart illustrating a method for detecting electronic whiteboard clients according to an embodiment of the invention.

The control node 110 may contain a main unit and an interactive display device. The interactive display device is connected to the main unit via USB (Universal Serial Bus) or a serial port cable, or else wirelessly via Bluetooth or WiFi. A device driver is usually installed on the control node 110 so that the interactive display device can act as a HID (Human Interface Device). The interactive display device may duplicate screen images displayed on the display unit 220 of the desktop computers 120 and 130, mobile phones 140 and 150, and a tablet computer 160 in real-time. FIG. 3 is a schematic diagram illustrating a screen image of an interactive whiteboard according to an embodiment of the invention. When the processing unit 210 of the control node 110 executes a whiteboard server, the interactive display device displays a screen image containing a whiteboard display region 310, a dual-screen layout region 330, a quadruple-screen layout region 350 and a connected-device display region 370. The connected-device display region 370 may display icons each icon representing a client device connected to the control node 110. The dual-screen layout region 330 and the quadruple-screen layout region 350 may be collectively referred to as a multi-screen layout region. FIG. 4 is a flowchart illustrating a method for detecting electronic whiteboard clients according to an embodiment of the invention. The method is performed by the processing unit 210 of any of the client devices 120, 130, 140, 150 and 160 and the processing unit 210 of the control node 110 in coordination. After activating a whiteboard client application (step S431), the processing unit 210 of the client device 120, 130, 140, 150 or 160 transmits a message to a whiteboard server executed by the processing unit 210 of the control node 110 via the communications interface 260 thereof to notify the whiteboard server that the whiteboard client application has been activated (step S433). The whiteboard server of the control node 110 may periodically attempt to receive a message from a client device via the communications interface 260 thereof (step S411), and after receiving a message from a client device (the "Yes" path of step S413), refresh the content of the connected-device display region 370 to append an icon representing a new client device (step S415). In step S433, the message may contain information regarding the client device 120, 130, 140, 150 or 160, such as a device name, a network address, a MAC (Media Access Control) address, etc. In step S415, the whiteboard server may store information regarding the client device associated with every icon, such as a network address, a MAC address, etc., in the memory 250.

Figure 5A:
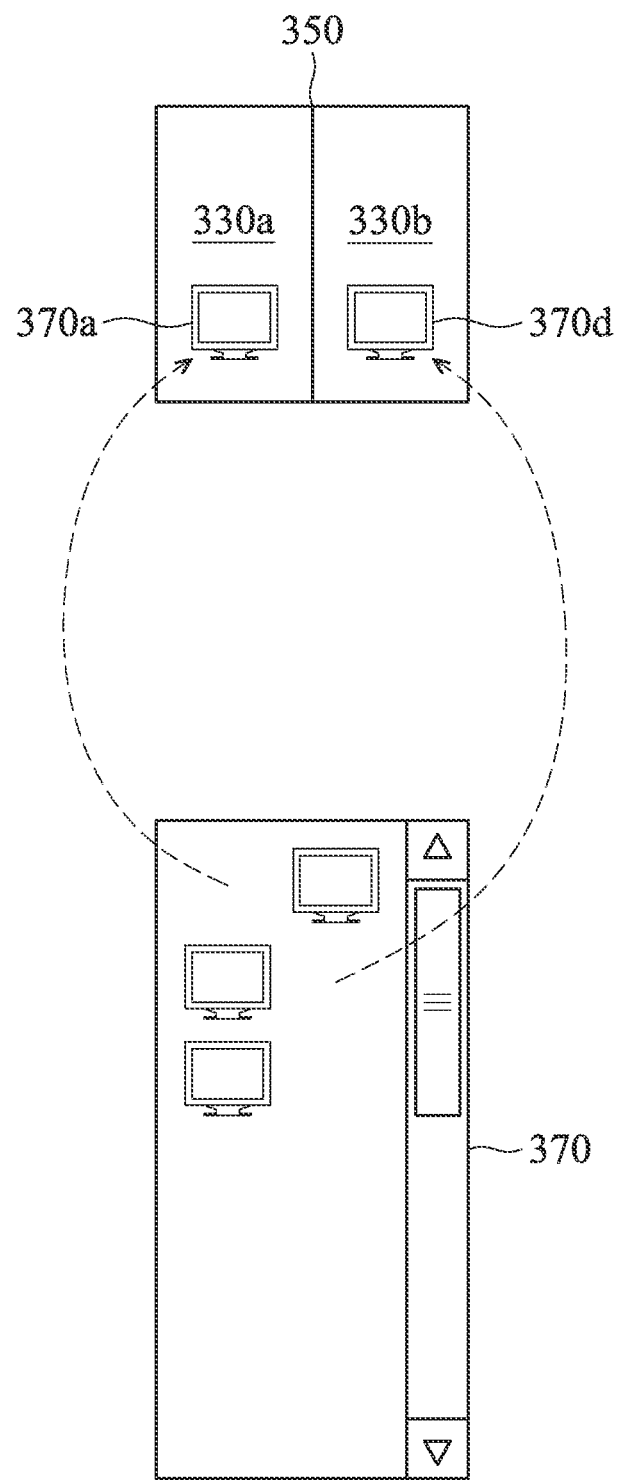
FIG. 5A is a schematic diagram illustrating an operation with a dual-screen layout region according to an embodiment of the invention.

In order to assist a user with configuring the whiteboard display region 310 to show screen data displayed on the display units 220 of two client devices, the whiteboard server places the dual-screen layout region 330 on the display unit 220. The user may drag two icons of the connected-device display region 370 into the left side 330a and the right side 330b of the dual-screen layout region 330, respectively, to advise the whiteboard server to acquire the screen data of the client devices associated with these two icons and display the screen data thereof in the left side and the right side of the whiteboard display region 310, respectively. The left side of the whiteboard display region 310 is the region of the width W1 and the height H1+H2 starting from the coordinates (X1, Y1), that is, the blocks 310a and 310c. The right side of the whiteboard display region 310 is the region of the width W2 and the height H1+H2 starting from the coordinates (X2, Y2), that is, the blocks 310b and 310d. FIG. 5A is a schematic diagram illustrating an operation with a dual-screen layout region according to an embodiment of the invention. Assume the icon 370a represents the desktop computer 120 and the icon 370d represents the mobile phone 150: After detecting that the user has dragged the icons 370a and 370d, respectively, into blocks 330a and 330b of the dual-screen layout region 330 the whiteboard server executed by the processing unit 210 of the control node 110 acquires the screen data from the desktop computer 120 and displays the acquired data on the left side of the whiteboard display region 310, and acquires the screen data from the mobile phone 150 and displays the acquired data on the right side of the whiteboard display region 310.

Figure 5B:
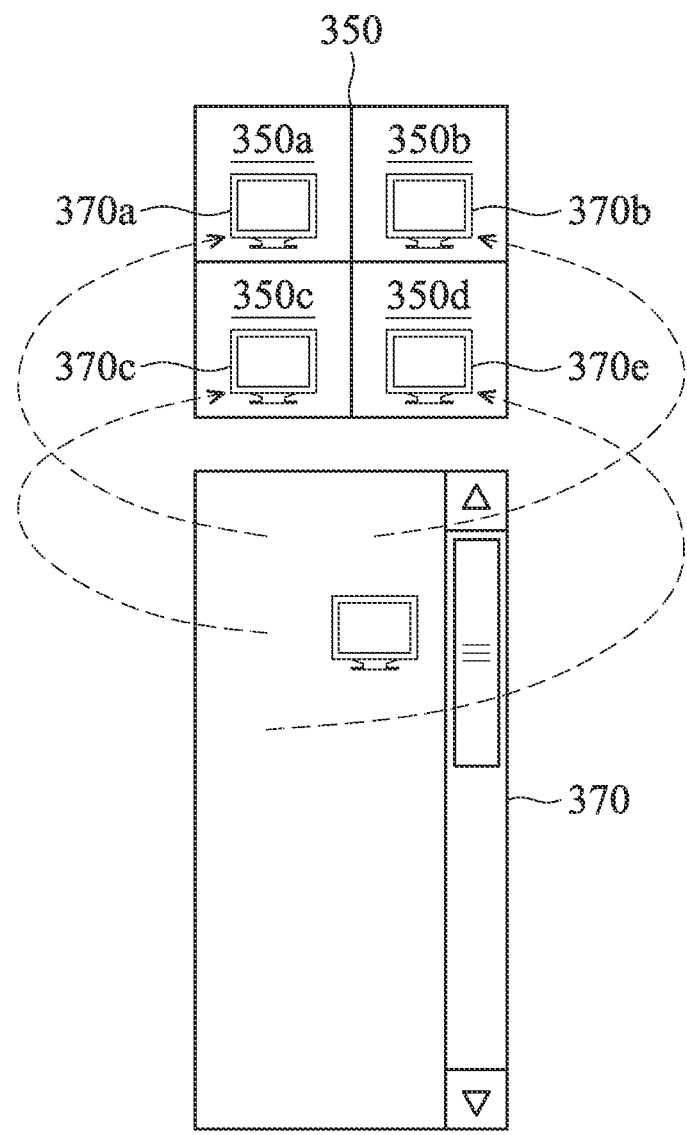
FIG. 5B is a schematic diagram illustrating an operation with a quadruple-screen layout region according to an embodiment of the invention.

In order to assist a user with configuring the whiteboard display region 310 to show screen data displayed on the display units 220 of four client devices, the whiteboard server places the quadruple-screen layout region 350 on the display unit 220. The user may drag four icons of the connected-device display region 370 into the upper-left block 350a, the upper-right block 350b, the lower-left block 350c and the lower-right block 350d to advise the whiteboard server to acquire the screen data of the client devices associated with these four icons and display the screen data thereof in the upper-left block, the upper-right block, the lower-left block and the lower-right block of the whiteboard display region 310, respectively. The upper-left block of the whiteboard display region 310 is the region of the width W1 and the height H1 starting from the coordinates (X1, Y1), that is, the block 310a. The upper-right block of the whiteboard display region 310 is the region of the width W2 and the height H1 starting from the coordinates (X2, Y2), that is, the block 310b. The lower-left block of the whiteboard display region 310 is the region of the width W1 and the height H2 starting from the coordinates (X3, Y3), that is, the block 310c. The lower-right block of the whiteboard display region 310 is the region of the width W2 and the height H2 starting from the coordinates (X4, Y4), that is, the block 310d. FIG. 5B is a schematic diagram illustrating an operation with a quadruple-screen layout region according to an embodiment of the invention. Assume that icon 370a represents the desktop computer 120, icon 370b represents the desktop computer 130, icon 370c represents the mobile phone 140 and icon 370e represents the tablet computer 160: After detecting that the user drags icons 370a, 370b, 370c and 370e into blocks 350a, 350b, 350c and 350d of the quadruple-screen layout region 350, the whiteboard server executed by the processing unit 210 of the control node 110 acquires the screen data from the desktop computer 120 and displays the acquired data in the upper-left block of the whiteboard display region 310, acquires the screen data from the desktop computer 130 and displays the acquired data in the upper-right block of the whiteboard display region 310, acquires the screen data from the mobile phone 140 and displays the acquired data in the lower-left block of the whiteboard display region 310, and acquires the screen data from the tablet computer 160 and displays the acquired data in the lower-right block of the whiteboard display region 310.

Figure 6A:
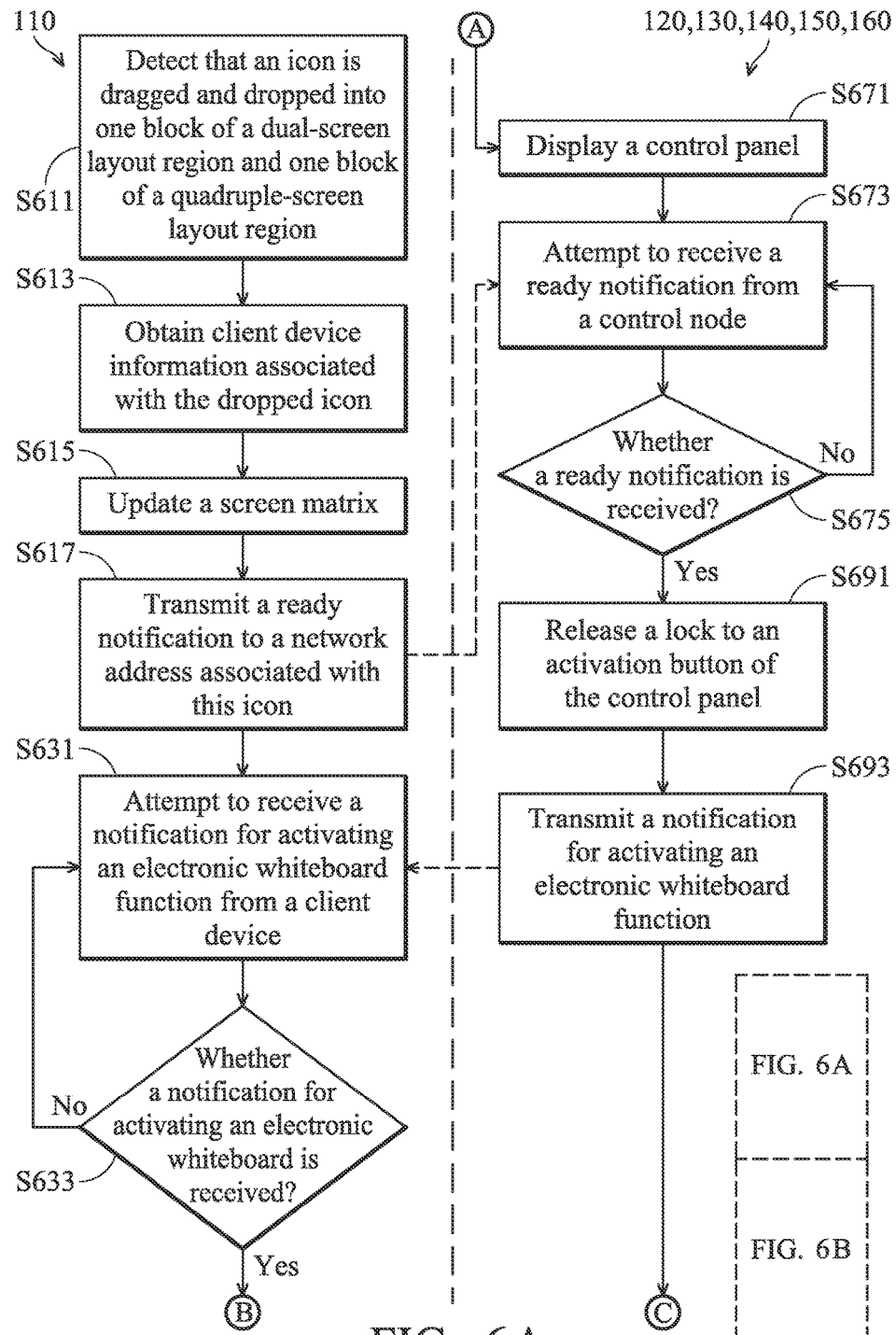
FIGS. 6A and 6B are flowcharts illustrating a method for configuring interactive whiteboards according to an embodiment of the invention.
Figure 6B:
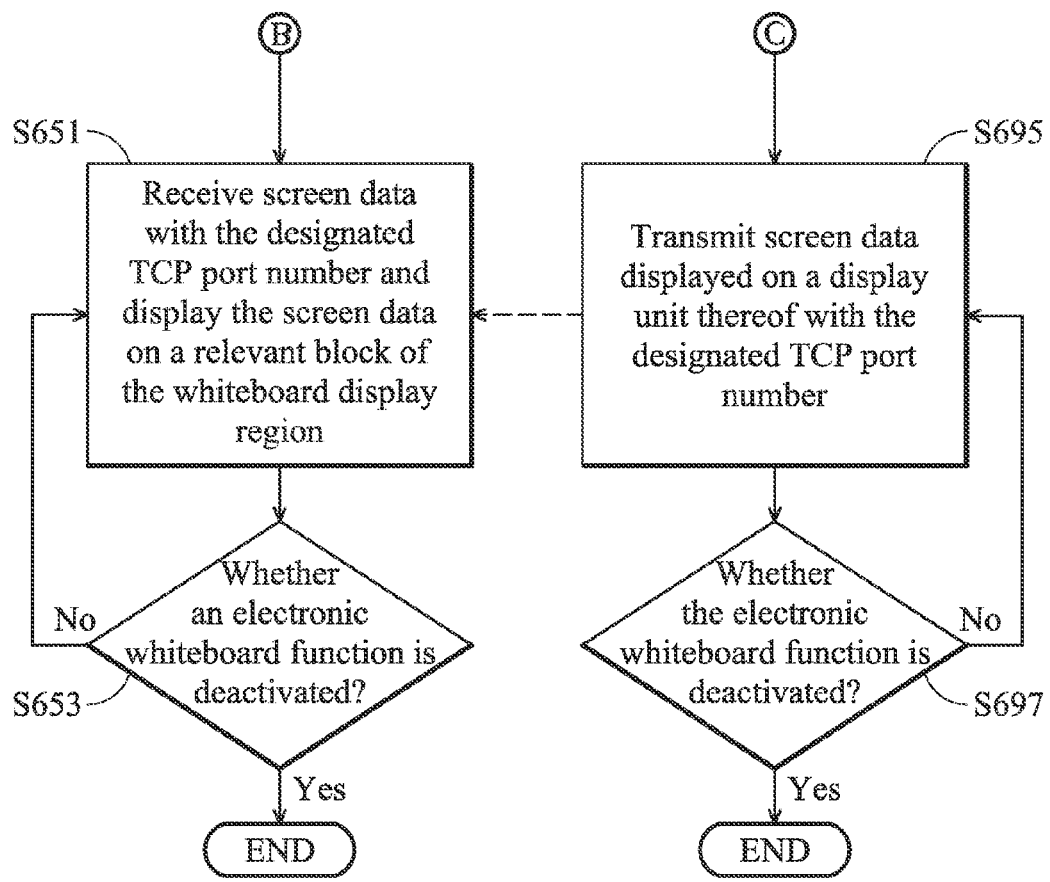
Figure 7A:
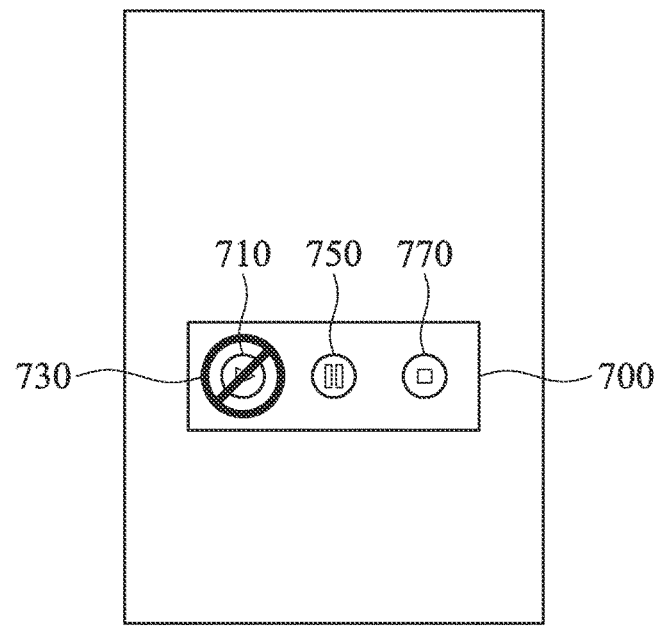
FIG. 7A is a schematic diagram illustrating a locked control panel according to an embodiment of the invention.

FIGS. 6A and 6B are flowcharts illustrating a method for configuring interactive whiteboards according to an embodiment of the invention. The method is performed by the processing unit 210 of any of the client devices 120, 130, 140, 150 and 160, when executing a whiteboard client application, and the processing unit 210 of the control node 110, when executing a whiteboard server, in coordination. After transmitting a message (step S433), the processing unit 210 of the client device 120, 130, 140, 150 or 160 displays a control panel on the display unit 220 thereof (step S671). FIG. 7A is a schematic diagram illustrating a locked control panel according to an embodiment of the invention. A control panel 700 includes an activation button 710, a pause button 750 and a stop button 770. A lock sign 730 is displayed on the activation button 710, leading to the electronic whiteboard function not to be activated when the activation button 710 is pressed. Then, the processing unit 210 of any of the client devices 120, 130, 140, 150 attempts to receive a ready notification from the control node 110 periodically (step S673) and determines whether a ready notification is received (step S675). Those skilled in the art will appreciate that the blocks 330a to 330b of the dual-screen layout region 330 and the blocks 350a to 350d of the quadruple-screen layout region 350 are UI (User Interface) controls. When the processing unit 210 of the control node 110 activates the whiteboard server, each of the blocks 330a to 330b of the dual-screen layout region 330 and the blocks 350a to 350d of the quadruple-screen layout region 350 is associated with a drag-and-drop event. When an icon of the connected-device display region 370 is dragged and dropped into one of the blocks 330a to 330b of the dual-screen layout region 330 and the blocks 350a to 350d of the quadruple-screen layout region 350, the associated drag-and-drop event is triggered. After detecting that a drag-and-drop event associated with one of the blocks 330a to 330b of the dual-screen layout region 330 and the blocks 350a to 350d of the quadruple-screen layout region 350 is triggered (step S611), the processing unit 210 of the control node 110 obtains client device information associated with the dropped icon, such as a device name, a network address, a MAC (Media Access Control) address, etc. (step S613) and updates a screen matrix accordingly (step S615). In step S613, the whiteboard server may read the client device information associated with the dragged icon from the memory 250 of the control node 110. In step S615, the screen matrix may be stored in the memory 250 of the control node 110. Each of the blocks 330a and 330b of the dual-screen layout region 330 and the blocks 350a to 350d of the quadruple-screen layout region 350 is associated with a particular region of the whiteboard display region 310 (as shown in FIGS. 5A and 5B), a TCP (Transmission Control Protocol) port number, and an UIBC (User Input Back Channel) port number. TCP ports are employed by the client devices 120 to 160 to transmit screen data to the control node 110, and UIBC ports are employed by the control node 110 to transmit control signals to the client devices 120 to 160, such as single-clicks, double-clicks, drags, etc., thereby enabling applications executed in the client devices 120 to 160 to refresh screen data accordingly. Taking the drags as examples illustrated in FIG. 5A, Table 1 describes an exemplary screen matrix:

TABLE 1

| Starting Coordinates | Width | Height | TCP port# | UIBC port# | Network Address |
|---|---|---|---|---|---|
| (X1, Y1) | W1 | H1 + H2 | 60 | 100 | 192.168.1.120 |
| (X2, Y2) | W2 | H1 + H2 | 61 | 101 | 192.168.1.150 |

Table 1 describes the network address of the desktop computer 120 as "192.168.1.120" and the network address of the mobile phone 150 as "192.168.1.150". The control node 110 displays screen data received through the TCP port 60 on the blocks 310*a* and 310*c* of the whiteboard display region 310 and transmits control signals detected in the blocks 310*a* and 310*c* to the network address "192.168.1.120" through the UIBC port 100. The control node 110 displays screen data received through the TCP port 61 on the blocks 310*b* and 310*d* of the whiteboard display region 310 and transmits control signals detected in the blocks 310*b* and 310*d* to the network address "192.168.1.150" through the UIBC port 101. Taking the drags as examples illustrated in FIG. 5B, Table 2 describes an exemplary screen matrix:

TABLE 2

| Starting Coordinates | Width | Height | TCP port# | UIBC port# | Network Address |
|---|---|---|---|---|---|
| (X1, Y1) | W1 | H1 | 60 | 100 | 192.168.1.120 |
| (X2, Y2) | W2 | H1 | 61 | 101 | 192.168.1.130 |
| (X3, Y3) | W1 | H2 | 62 | 102 | 192.168.1.140 |
| (X4, Y4) | W2 | H2 | 63 | 103 | 192.168.1.160 |

Table 2 describes the network address of the desktop computer 120 as "192.168.1.120", the network address of the desktop computer 130 as "192.168.1.130", the network address of the mobile phone 140 as "192.168.1.140" and the network address of the tablet computer 160 as "192.168.1.160". The control node 110 displays screen data received through the TCP port 60 on the block 310*a* of the whiteboard display region 310 and transmits control signals detected in the block 310*a* to the network address "192.168.1.120" through the UIBC port 100. The control node 110 displays screen data received through the TCP port 61 on the block 310*b* of the whiteboard display region 310 and transmits control signals detected in the block 310*b* to the network address "192.168.1.130" through the UIBC port 101. The control node 110 displays screen data received through the TCP port 62 on the block 310*c* of the whiteboard display region 310 and transmits control signals detected in the block 310*c* to the network address "192.168.1.140" through the UIBC port 102. The control node 110 displays screen data received through the TCP port 63 on the block 310*d* of the whiteboard display region 310 and transmits control signals detected in the block 310*d* to the network address "192.168.1.160" through the UIBC port 103.

After updating the screen matrix (step S615), the processing unit 210 of the control node 110 transmits a ready notification to a network address associated with this icon via the communications interface 260 of the control node 110, which includes a TCP port number and an UIBC port number associated with the block in which the icon has been dropped, thereby enabling the relevant client device to receive the ready notification (step S617). Next, the processing unit 210 of any of the client devices 120, 130, 140, 150 attempts to receive a notification for activating an electronic whiteboard function from a client device periodically (step S631) and determined whether a notification for activating an electronic whiteboard is received (step S633).

Figure 7B:
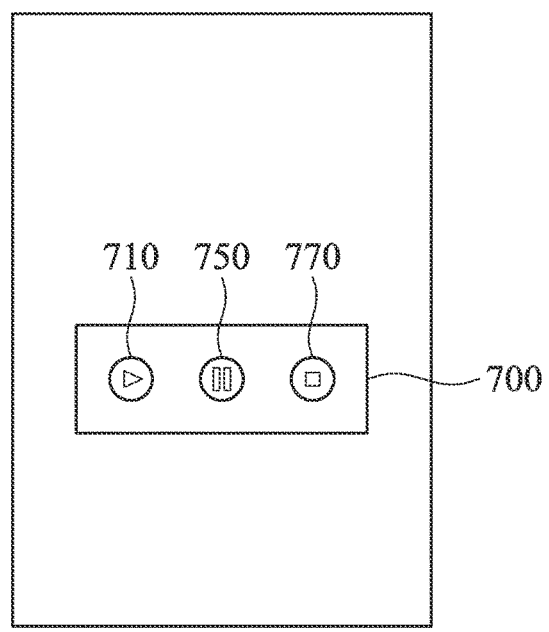
FIG. 7B is a schematic diagram illustrating a control panel according to an embodiment of the invention.

After receiving a ready notification (the "Yes" path of step S675), the processing unit 210 of the client device 120, 130, 140, 150 or 160 releases a lock to an activation button of the control panel, thereby enabling an user to activate an electronic whiteboard function by pressing the activation button (step S691). FIG. 7B is a schematic diagram illustrating a control panel according to an embodiment of the invention. The activation button 710, the pause button 750 and the stop button 770 of the control panel 700 are all active. After the user presses the activation button 710, the processing unit 210 of the client device 120, 130, 140, 150 or 160 transmits a notification for activating an electronic whiteboard function to the whiteboard server of the control node 110 via the communications interface thereof (step S693). It should be noted that the processing unit 210 of the client device 120, 130, 140, 150 or 160 temporarily stops outputting screen data on the display unit 220 thereof to the control node 110 after the pause button 750 has been pressed, and resumes the output of the screen data to the control node 110 after the activation button 710 is pressed. Moreover, after the stop button 770 is pressed, the processing unit 210 of the client device 120, 130, 140, 150 or 160 deactivates the electronic whiteboard function. After transmitting a notification for activating the electronic whiteboard function (step S693), the processing unit 210 of the client device 120, 130, 140, 150 or 160 periodically transmits screen data displayed on the display unit 220 thereof with the designated TCP port number (which was received in step S673) to the whiteboard server of the control node 110 through the communications interface 260 thereof (step S695) until the electronic whiteboard function is deactivated (the "Yes" path of step S697).

After receiving a notification for activating an electronic whiteboard function from this client device (the "Yes" path of step S633), the processing unit 210 of the control node 110 periodically receives screen data with the designated TCP port number through the communications interface 260 thereof and displays the screen data on a relevant block of the whiteboard display region 310 according to information of the screen matrix (step S651) until the electronic whiteboard function is deactivated (the "Yes" path of step S653). In step S651, the processing unit 210 of the control node 110 listens to packets having all potential TCP port numbers, such as ports 60 to 63, and after receiving a packet having one potential TCP port number, it displays the screen data of the packet on a relevant block of the whiteboard display region 310 according to the information of the screen matrix.

Figure 8A:
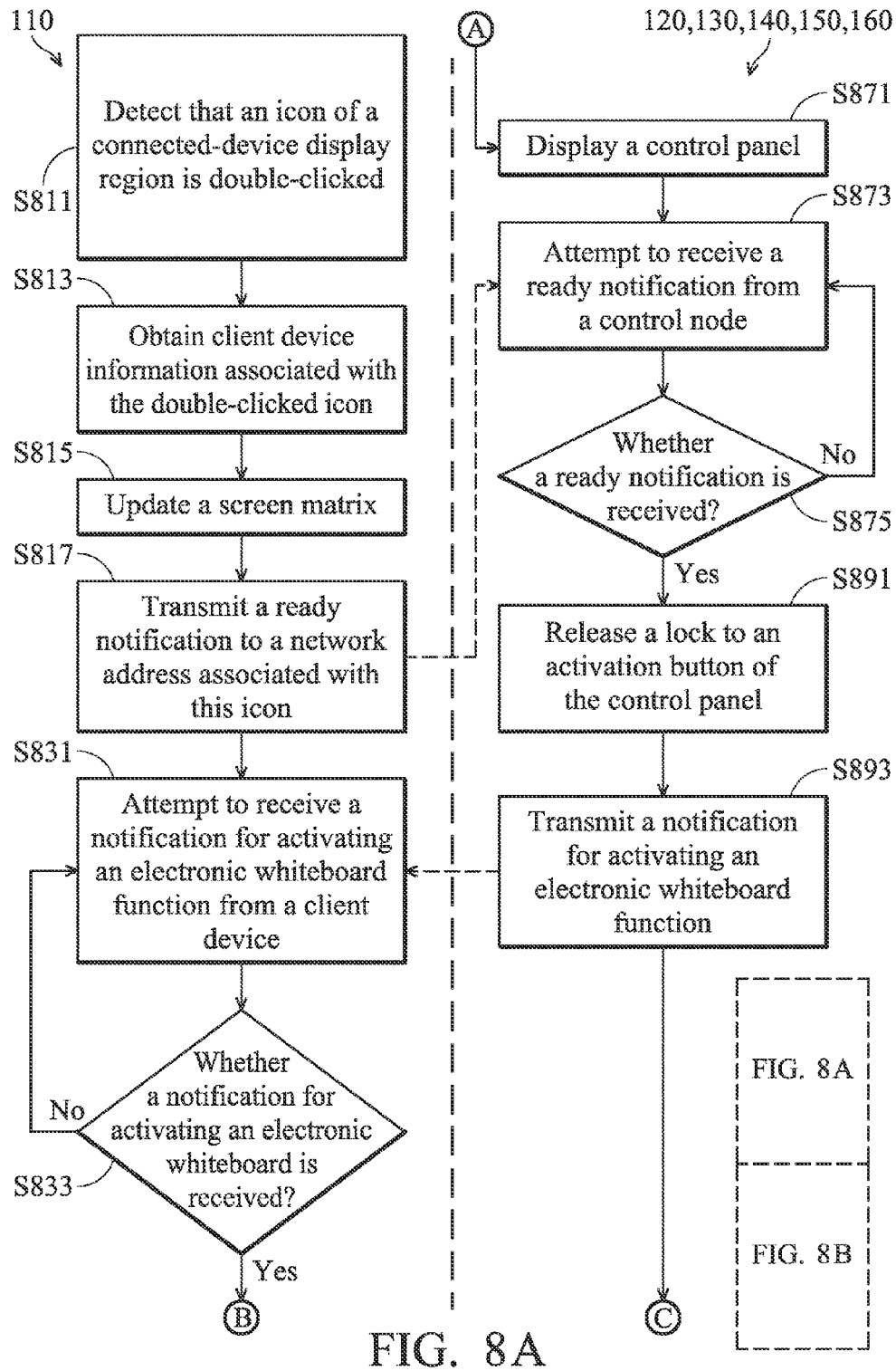
FIGS. 8A and 8B are flowcharts illustrating a method for configuring interactive whiteboards according to an embodiment of the invention.
Figure 8B:
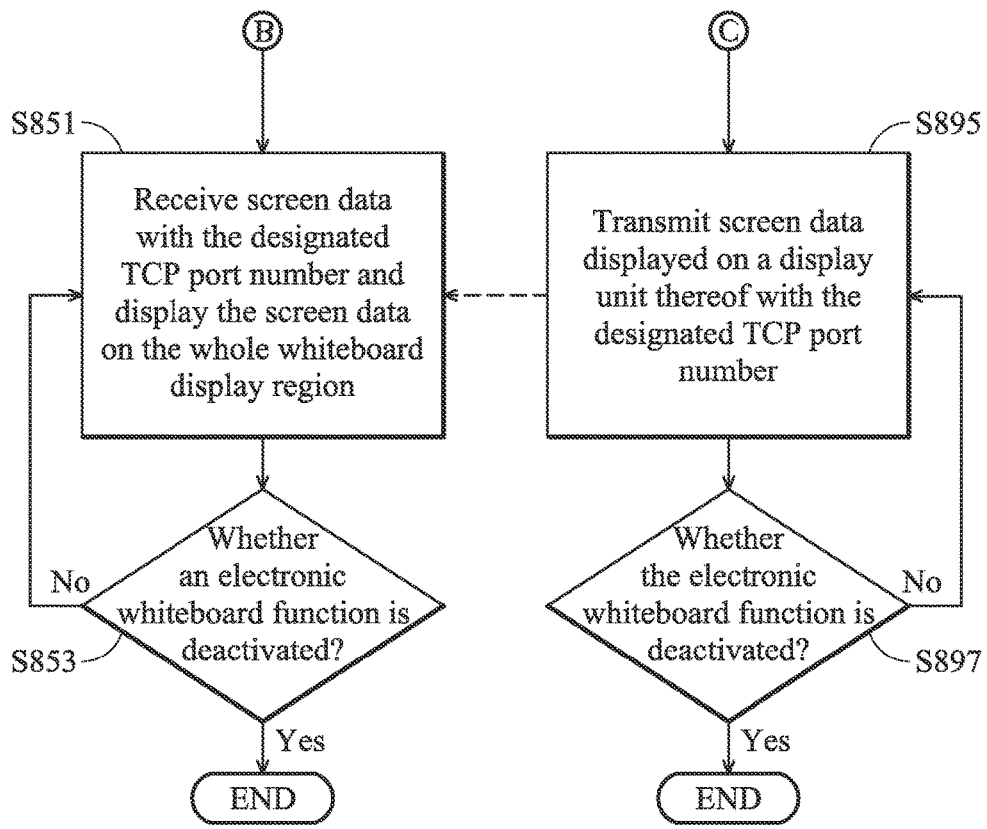

FIGS. 8A and 8B are flowcharts illustrating a method for configuring interactive whiteboards according to an embodiment of the invention. The method is performed by the processing unit 210 of any of the client devices 120, 130, 140, 150 and 160, when executing a whiteboard client application, and the processing unit 210 of the control node 110, when executing a whiteboard server, in coordination. The method is employed to duplicate a screen displayed on a client device associated with an icon in the whole whiteboard display region 310 when a user double-clicks the icon of the connected-device display region 370. In the method, details of steps S871 to S897 executed by the processing unit 210 of the client device 120, 130, 140, 150 or 160 are the same as that of steps S671 to S697 as shown in FIG. 6, and are omitted for brevity. The following describes operations performed by the processing unit 210 of the control node 110. After detecting that an icon of the connected-device display region 370 is double-clicked (step S811), the processing unit 210 of the control node 110 obtains client device information associated with the double-clicked icon, such as a network address, etc. (step S813) and updates a screen matrix accordingly (step S815). For example, when the icon associated with the desktop computer 120 is double-clicked, Table 3 describes an exemplary screen matrix:

TABLE 3

| Starting Coordinates | Width | Height | TCP port# | UIBC port# | Network Address |
|---|---|---|---|---|---|
| (X1, Y1) | W1 + W2 | H1 + H2 | 60 | 100 | 192.168.1.120 |

Table 3 describes the network address of the desktop computer 120 as "192.168.1.120". The control node 110 displays screen data received through the TCP port 60 on the blocks 310a to 310d of the whiteboard display region 310 and transmits control signals detected in the blocks 310a to 310d to the network address "192.168.1.120" through the UIBC port 100. After updating the screen matrix (step S815), the processing unit 210 of the control node 110 transmits a ready notification to a network address associated with this icon via the communications interface 260 of the control node 110, which includes a TCP port number and an UIBC port number associated with the whole whiteboard display region 310, thereby enabling the relevant client device to receive the ready notification (step S817). Next, it is attempted to receive a notification for activating an electronic whiteboard function from this client device periodically (step S831) and determined whether a notification for activating an electronic whiteboard is received from this client device (step S833). After receiving a notification for activating an electronic whiteboard function from this client device (the "Yes" path of step S833), the processing unit 210 of the control node 110 periodically receives screen data with the designated TCP port number through the communications interface 260 thereof and displays the screen data on the whole whiteboard display region 310 according to information of the screen matrix (step S851) until the electronic whiteboard function is deactivated (the "Yes" path of step S853).

Although the embodiment has been described as having specific elements in FIG. 2, it should be noted that additional elements may be included to achieve better performance without departing from the spirit of the invention. While the process flows described in FIGS. 4, 6 and 8 each includes a number of operations that appear to occur in a specific order, it should be apparent that these processes can include more or fewer operations, which can be executed in series or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for operating interactive whiteboards, performed by a processing unit of a control node, comprising:
providing a connected-device display region, a multi-screen layout region and a whiteboard display region on an interactive display device, wherein the multi-screen layout region is segmented into a plurality of first blocks, the whiteboard display region is segmented into a plurality of second blocks and each first block is identical to one second block;
after detecting that an icon of the connected-device display region is dragged and dropped into one first block of the multi-screen layout region, obtaining a network address associated with the icon;
obtaining a first TCP (Transmission Control Protocol) port number associated with the first block comprising the dropped icon;
transmitting a first ready notification comprising the first TCP port number to the network address;
receiving first screen data with the first TCP port number; and
displaying the first screen data on the second block of the whiteboard display region, which is associated with the first block comprising the dropped icon.

2. The method of claim 1, wherein each first block is associated with one predefined TCP port number.

3. The method of claim 1, further comprising:
obtaining a first UIBC (User Input Back Channel) port number associated with the first block comprising the dropped icon; and
transmitting the first UIBC port number to the network address via the first ready notification associated with the dropped icon to the network address, wherein the first ready notification comprises the first TCP port number and an UIBC port number associated with the first block.

4. The method of claim 3, wherein each first block is associated with one predefined UIBC port number.

5. The method of claim 1, further comprising:
obtaining a message from a client device, wherein the message indicates that a whiteboard client application has been activated and comprises the network address;
displaying the icon in the connected-device display region; and
storing the network address in a memory,
wherein the network address associated with the icon is obtained from the memory.

6. The method of claim 1, further comprising:
after detecting that the icon of the connected-device display region has been double-clicked, obtaining the network address associated with the icon;
obtaining a second TCP port number associated with the whole whiteboard display region;
transmitting a second ready notification comprising the second TCP port number to the network address;
receiving second screen data with the second TCP port number; and
displaying the second screen data to the whole whiteboard display region.

7. The method of claim 6, further comprising:
obtaining a second UIBC (User Input Back Channel) port number associated with the whole whiteboard display region; and
transmitting the second UIBC port number to the network address via the second ready notification.

8. The method of claim 6, further comprising:
updating a screen matrix to store display region information regarding the whole whiteboard display region, and the second TCP port number associated with the whole whiteboard display region,
wherein the step for displaying the second screen data on the whole whiteboard display region further comprises:
displaying the second screen data on the whole whiteboard display region according to the display region information of the screen matrix.

9. An apparatus for operating interactive whiteboards, comprising:
  an interactive display device, providing a connected-device display region, a multi-screen layout region and a whiteboard display region, wherein the multi-screen layout region is segmented into a plurality of first blocks, the whiteboard display region is segmented into a plurality of second blocks and each first block is identical to one second block;
  a communications interface; and
  a processing unit, coupled to the interactive display device and the communications interface, and after detecting that an icon of the connected-device display region is dragged and dropped into one first block of the multi-screen layout region, obtaining a network address associated with the icon; obtaining a first TCP (Transmission Control Protocol) port number associated with the first block comprising the dropped icon; transmitting a first ready notification comprising the first TCP port number to the network address; receiving first screen data with the first TCP port number via the communications interface; and displaying the first screen data on the second block of the whiteboard display region, which is associated with the first block comprising the dropped icon.

10. The apparatus of claim 9, wherein each first block is associated with one predefined TCP port number.

11. The apparatus of claim 9, wherein the processing unit obtains a first UIBC (User Input Back Channel) port number associated with the first block comprising the dropped icon; and transmits the first UIBC port number to the network address via the first ready notification associated with the dropped icon to the network address, wherein the first ready notification comprises the first TCP port number and an UIBC port number associated with the first block.

12. The apparatus of claim 11, wherein each first block is associated with one predefined UIBC port number.

13. The apparatus of claim 9, further comprising:
  a memory,
  wherein the processing unit obtains a message from a client device via the communications interface, where the message indicates that a whiteboard client application has been activated and comprises the network address; displays the icon in the connected-device display region; and stores the network address in the memory; and obtains the network address associated with the icon from the memory.

14. The apparatus of claim 9, further comprising:
  a memory, storing a screen matrix,
  wherein the processing unit updates a screen matrix to store display-region information regarding the second block associated with the first block comprising the dropped icon, and the first TCP port number associated with the first block comprising the dropped icon; and displays the first screen data on the second block of the whiteboard display region, which is associated with the first block comprising the dropped icon, according to the display region information of the screen matrix.

15. The apparatus of claim 14, wherein the display region information comprises a set of starting coordinates, a width and a height.

16. The apparatus of claim 9, wherein the processing unit, after detecting that the icon of the connected-device display region has been double-clicked, obtaining the network address associated with the icon; obtains a second TCP port number associated with the whole whiteboard display region; transmits a second ready notification comprising the second TCP port number to the network address; receives second screen data with the second TCP port number; and displays the second screen data to the whole whiteboard display region.

17. The apparatus of claim 16, wherein the processing unit obtains a second UIBC (User Input Back Channel) port number associated with the whole whiteboard display region; and transmits the second UIBC port number to the network address via the second ready notification.

18. The apparatus of claim 16, further comprising:
  a memory, storing a screen matrix,
  wherein the processing unit updates the screen matrix to store display region information regarding the whole whiteboard display region, and the second TCP port number associated with the whole whiteboard display region; and displays the second screen data on the whole whiteboard display region according to the display region information of the screen matrix.

19. A method for operating interactive whiteboards, performed by a processing unit of a control node, comprising:
  providing a connected-device display region, a multi-screen layout region and a whiteboard display region on an interactive display device, wherein the multi-screen layout region is segmented into a plurality of first blocks, the whiteboard display region is segmented into a plurality of second blocks and each first block is identical to one second block;
  after detecting that an icon of the connected-device display region is dragged and dropped into one first block of the multi-screen layout region, obtaining a network address associated with the icon;
  obtaining a first TCP (Transmission Control Protocol) port number associated with the first block comprising the dropped icon;
  transmitting a first ready notification comprising the first TCP port number to the network address;
  receiving first screen data with the first TCP port number;
  displaying the first screen data on the second block of the whiteboard display region, which is associated with the first block comprising the dropped icon; and
  updating a screen matrix to store display-region information regarding the second block associated with the first block comprising the dropped icon, and the first TCP port number associated with the first block comprising the dropped icon,
  wherein the step for displaying the first screen data on the second block of the whiteboard display region, which is associated with the dropped first block, further comprises:
    displaying the first screen data on the second block of the whiteboard display region, which is associated with the first block comprising the dropped icon, according to the display region information of the screen matrix.

20. The method of claim 19, wherein the display region information comprises a set of starting coordinates, a width and a height.

* * * * *